United States Patent
Ohta

(10) Patent No.: US 9,762,773 B2
(45) Date of Patent: Sep. 12, 2017

(54) IMAGE PROCESSING APPARATUS AND METHOD FOR INCREASING SHARPNESS OF IMAGES

(71) Applicant: OMRON Corporation, Kyoto (JP)

(72) Inventor: Takashi Ohta, Shiga (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/930,439

(22) Filed: Nov. 2, 2015

(65) Prior Publication Data

US 2016/0286092 A1    Sep. 29, 2016

(30) Foreign Application Priority Data

Mar. 26, 2015   (JP) .................................. 2015-064378

(51) Int. Cl.
| | |
|---|---|
| G06K 9/00 | (2006.01) |
| H04N 1/60 | (2006.01) |
| G06K 9/46 | (2006.01) |
| H04N 1/62 | (2006.01) |
| G06T 5/00 | (2006.01) |

(Continued)

(52) U.S. Cl.
CPC ......... *H04N 1/6027* (2013.01); *G06K 9/0061* (2013.01); *G06K 9/00228* (2013.01); *G06K 9/00281* (2013.01); *G06K 9/00288* (2013.01); *G06K 9/4638* (2013.01); *G06T 5/00* (2013.01);
(Continued)

(58) Field of Classification Search
None
See application file for complete search history.

(56) References Cited

U.S. PATENT DOCUMENTS

| | | | |
|---|---|---|---|
| 7,444,017 B2* | 10/2008 | Gallagher ............ | G06K 9/0061 382/117 |
| 9,349,071 B2* | 5/2016 | Kim ................... | G06K 9/00597 |

(Continued)

FOREIGN PATENT DOCUMENTS

| | | |
|---|---|---|
| JP | 2012-190350 A | 10/2012 |
| JP | 2012-190351 A | 10/2012 |
| KR | 10-0950138 B1 | 3/2010 |

OTHER PUBLICATIONS

Li et al, A Fast and Robust Method for Iris Localization Using Light Spot, Journal of Computational Information Systems 7: 13 (2011) 4619-4627.*

(Continued)

*Primary Examiner* — Andrae S Allison
(74) *Attorney, Agent, or Firm* — Osha Liang LLP

(57) ABSTRACT

An image processing apparatus comprises an image acquiring unit configured to acquire a first image, which is an image including an eye; an image generating unit configured to generate a second image, which is a binary image representing an edge of the first image; a classifying unit configured to classify, based on presence or absence of the edge, pixels included in the second image; and a pupil-region generating unit configured to generate a pupil region, which is a region corresponding to a pupil in the first image, based on a classification result, wherein when pixels having a same value are present separately in a plurality of blocks in the second image, the classifying unit performs the classification of the pixels further based on areas of the blocks or luminance values of pixels in the first image corresponding to the blocks.

10 Claims, 10 Drawing Sheets

(51) Int. Cl.
*G06T 7/13* (2017.01)
*G06T 7/155* (2017.01)
*G06T 7/187* (2017.01)

(52) U.S. Cl.
CPC ............... *G06T 7/13* (2017.01); *G06T 7/155* (2017.01); *G06T 7/187* (2017.01); *H04N 1/624* (2013.01)

(56) References Cited

U.S. PATENT DOCUMENTS

| | | | | |
|---|---|---|---|---|
| 2005/0232482 | A1* | 10/2005 | Ikeda | G06K 9/00597 382/167 |
| 2006/0098867 | A1* | 5/2006 | Gallagher | G06K 9/0061 382/167 |
| 2006/0262965 | A1* | 11/2006 | Sugita | G06K 9/00597 382/117 |
| 2007/0013866 | A1* | 1/2007 | Sugita | G06K 9/00597 351/205 |
| 2008/0069410 | A1* | 3/2008 | Ko | G06K 9/0061 382/117 |
| 2008/0170760 | A1* | 7/2008 | Monro | G06K 9/482 382/117 |
| 2009/0000637 | A1* | 1/2009 | Takano | A61B 3/0025 132/200 |
| 2010/0054548 | A1* | 3/2010 | Inada | G06K 9/0061 382/117 |
| 2010/0189357 | A1* | 7/2010 | Robin | G06T 11/001 382/195 |
| 2010/0290668 | A1* | 11/2010 | Friedman | G06K 9/00604 382/103 |
| 2014/0072230 | A1 | 3/2014 | Ruan et al. | |
| 2016/0110626 | A1* | 4/2016 | Kim | G06K 9/00597 382/117 |

OTHER PUBLICATIONS

Notification of Reason for Refusal issued in corresponding Korean Application No. 10-2015-0145904, mailed on Nov. 15, 2016 (6 pages).

Won-ho Mun et al.; "Detection of eye using optimal edge technique and intensity information"; Dept. of Computer Engineering, Pusan National University; Dept. of Design, Pusan National University; pp. 196-199) (4 pages).

Extended European Search Report in counterpart European Patent Application No. 15 19 0714.4 issued Aug. 8, 2016 (10 pages).

M. Dashtban et al; "A Novel and Robust Approach for Iris Segmentation"; International Journal of Computer Applications, vol. 34,. No. 6,, pp. 63-70; Nov. 2011 (8 pages).

* cited by examiner

IMAGE PROCESSING APPARATUS AND METHOD FOR INCREASING SHARPNESS OF IMAGES

CROSS-REFERENCE TO RELATED APPLICATION

This application is based on Japanese Patent Application No. 2015-064378 filed with the Japan Patent Office on Mar. 26, 2015, the entire contents of which are incorporated herein by reference.

BACKGROUND OF THE INVENTION

Field of the Invention

The present invention relates to an image processing technique for extracting a region corresponding to a pupil of a person from an image including a face.

Description of the Related Art

In recent years, a technique for automatically correcting an image including a face of a person (a face image) photographed using a digital camera or the like is becoming more common. In particular, by detecting pupils from the face image, for example, it is possible to correct a color tone failure phenomenon in which the pupils of a person are shown in red due to strobe light and correct the image such that the pupils look bigger to improve appearance.

As a technique for detecting a region where a pupil is present (a pupil region) from a face image, for example, there is an image processing apparatus, described in Japanese Patent Application Laid-Open No. 2012-190350. The image processing apparatus calculates edge points from a luminance gradient of a face image and specifies an ellipse representing the contour of the pupil.

SUMMARY OF THE INVENTION

In a method described in Japanese Patent Application Laid-Open No. 2012-190350, an edge in the longitudinal direction of the face image is extracted to specify the boundary of the pupil.

However, in such a method, when an edge is present other than in the boundary of pupil, misdetection tends to be caused. For example, when catchlight is present in the pupil, in some case, only the pupil region cannot be accurately extracted.

The present invention has been devised in view of the above problems and it is an object of the present invention to provide a technique for improving accuracy in an image processing apparatus that extracts a region corresponding to a pupil from a face image.

The present invention in its one aspect provides an image processing apparatus comprises an image acquiring unit configured to acquire a first image, which is an image including an eye of a person; an image generating unit configured to generate a second image, which is a binary image representing an edge of the first image; a classifying unit configured to classify, on the basis presence or absence of the edge, pixels included in the second image; and a pupil-region generating unit configured to generate a pupil region, which is a region corresponding to a pupil of the person in the first image, on the basis of a result of the classification, wherein when pixels having a same value are present separately in a plurality of blocks in the second image, the classifying unit performs the classification of the pixels further on the basis of areas of the blocks or luminance values of pixels in the first image corresponding to the blocks.

The image processing apparatus according to the present invention is an apparatus that extracts a pupil region from an acquired face image. The pupil region is a region including a pupil (an iris and a pupil other than the white of the eye) of a person. Typically, the pupil region is a circular region having a center coordinate in the center point of the pupil.

The extraction of the pupil is performed on the basis of an image (a second image) obtained as a result of extracting an edge of a first image, which is an input image, and binarizing the edge. The second image is a binary image including pixels not corresponding to the edge and pixels corresponding to the edge. The edge is present in the boundary of the pupil and is absent on the inside of the pupil. Therefore, in order to extract the pupil region, the pixels are classified on the basis of presence or absence of the edge.

However, the pixels not corresponding to the edge is also present on the outer side of the pupil region. Therefore, when the classification is simply performed on the basis of only the edge, a region other than the pupil region is also extracted. Only the pupil region cannot be correctly extracted.

Therefore, when pixels having the same value in the second image are present separately in a plurality of blocks (groups), the image processing apparatus according to the present invention performs the classification of the pixels further on the basis of the areas of the blocks and luminance values of the pixels in the first image corresponding to the blocks.

According to such a configuration, it is possible to accurately extract only the pupil region without being affected by unnecessary edge information.

The classifying unit may include a first classifying unit configured to classify, among the pixels included in the second image, the pixels not corresponding to the edge into a first pixel type and the pixels corresponding to the edge into a second pixel type; and a second classifying unit configured to reclassify, when the pixels not corresponding to the edge are present separately in a plurality of blocks and when there is a block having an area which is smaller than a first threshold, or a block in which an average luminance of the pixels in a corresponding region of the first image is higher than a second threshold, the pixels included in the block into the second pixel type, and the pupil-region generating unit may generate the pupil region on the basis of a distribution of the pixels classified into the first pixel type.

In this way, if the area of the block including the pixels classified as the first pixel type is sufficiently smaller than the area of an assumed pixel region or if the average luminance of the pixels in the corresponding region of the first image is sufficiently larger than the luminance in the assumed pupil region, it is surmised that the pixels included in the block are not the pupils corresponding to the pupil. Therefore, it is possible to improve accuracy by reclassifying such pixels into the second pixel type.

The classifying unit may further include a third classifying unit configured to reclassify, when a block of the pixels classified into the second pixel type is surrounded by the pixels classified into the first pixel type, the pixels included in the block into the first pixel type.

For example, when catchlight (highlight) is present on the inner side of the pupil, the pixels corresponding to the edge are present on the inner side of the pupil region. Therefore, when the pixels corresponding to the edge are surrounded by the pixels not corresponding to the edge, a classification result of the pixels is reversed. Consequently, it is possible to delete information concerning the edge present on the inner side of the pupil.

The first threshold may be a value obtained by multiplying a largest area among respective areas of the plurality of blocks by a predetermined ratio.

The second threshold may be a value obtained by adding a predetermined value to a lowest value among average luminance values respectively corresponding to the plurality of blocks.

As the area of a block is smaller and as the average luminance value is larger, the block is less likely to be the block corresponding to the pupil. Therefore, a threshold is set with reference to a maximum value of the areas in the plurality of blocks and a minimum value of the average luminance values and magnitudes of the areas and the average luminance values are determined. Consequently, it is possible to filter regions with low probabilities of being the pupil.

When the lateral direction of the first image is taken as an X axis and the longitudinal direction of the first image is taken as a Y axis and a region formed by the pixels classified into the first pixel type is set as a provisional pupil region, the pupil-region generating unit may set, as a Y coordinate of the center of the pupil region, an intermediate value between a maximum value and a minimum value of a Y coordinate of the provisional pupil region, calculates X coordinates, each of which is a center point on the X axis of the provisional pupil region, for respective Y coordinates, and determine an X coordinate of the center of the pupil region on the basis of a distribution of the obtained X coordinates.

The region (the provisional pupil region) formed by the pixels classified into the first pixel type is a region assumed to include the pupil. However, when a part where a luminance value is not large and a clear edge is absent such as the boundary between the pupil and the eyelid is present around the pupil, a region other than the pupil is sometimes included in the provisional pupil region. In such a case, the provisional pupil region is not circular and is a distorted shape, a part of which projects.

Therefore, the pupil-region generating unit specifies a center position of the pupil region on the basis of the shape of the provisional pupil region.

Specifically, the intermediate value between the maximum value and the minimum value of the Y coordinate of the provisional pupil region is set as the Y coordinate of the center of the pupil region. Concerning the size in the Y-axis direction, the provisional pupil region and the pupil region substantially coincide with each other. Therefore, a coordinate in the middle can be used.

On the other hand, the provisional pupil region tends to project in the left-right direction because of the presence of the eyelid. Therefore, a center point in the X-axis direction of the provisional pupil region is calculated for each Y coordinate. An X coordinate of the center of the pupil region is determined on the basis of a distribution of the obtained X coordinates. Consequently, even if the provisional pupil region has a distorted shape, it is possible to estimate the original position of the pupil region.

The pupil-region generating unit may set, as the diameter of the pupil region, the diameter of the provisional pupil region on an axis passing through the center of the pupil region and parallel to the X axis.

According to such a configuration, it is possible to accurately acquire the diameter of the pupil region.

The image processing apparatus according to the present invention may further include a position-information acquiring unit configured to acquire position information representing a boundary position of an eyelid. The pupil-region generating unit may correct the shape of the generated pupil region on the basis of the position information.

The pupil of the person is sometimes hidden by the eyelid. Therefore, when other processing is performed directly using the generated pixel region, an unnatural image is sometimes obtained. In order to prevent this, the shape of the pupil region may be corrected after information representing the position of the eyelid is acquired. For example, a region hidden by the eyelid may be deleted. Consequently, it is possible to perform natural image processing for the pupil.

The first classifying unit may set a circle region having a predetermined size and centered on a center point of the eye, and unconditionally classify the pixels present outside the circle region into the second pixel type.

The circle region set by the classifying unit is a region estimated as including the pupil. With such a configuration, it is possible to omit processing for a region where the pupil is clearly absent. It is possible to increase the speed of processing.

Note that the present invention can be specified as an image processing apparatus including at least a part of the units. The present invention can also be specified as an image processing method performed by the image processing apparatus. The present invention can also be specified as a computer program for causing a computer to execute the image processing method. The processing and the units can be freely combined and implemented as long as technical contradiction does not occur.

According to the present invention, in the image processing apparatus that extracts a region corresponding to a pupil from a face image, it is possible to improve accuracy.

DESCRIPTION OF THE EMBODIMENTS

First Embodiment

Preferred embodiments of the present invention are explained below with reference to the drawings.

Figure 1:
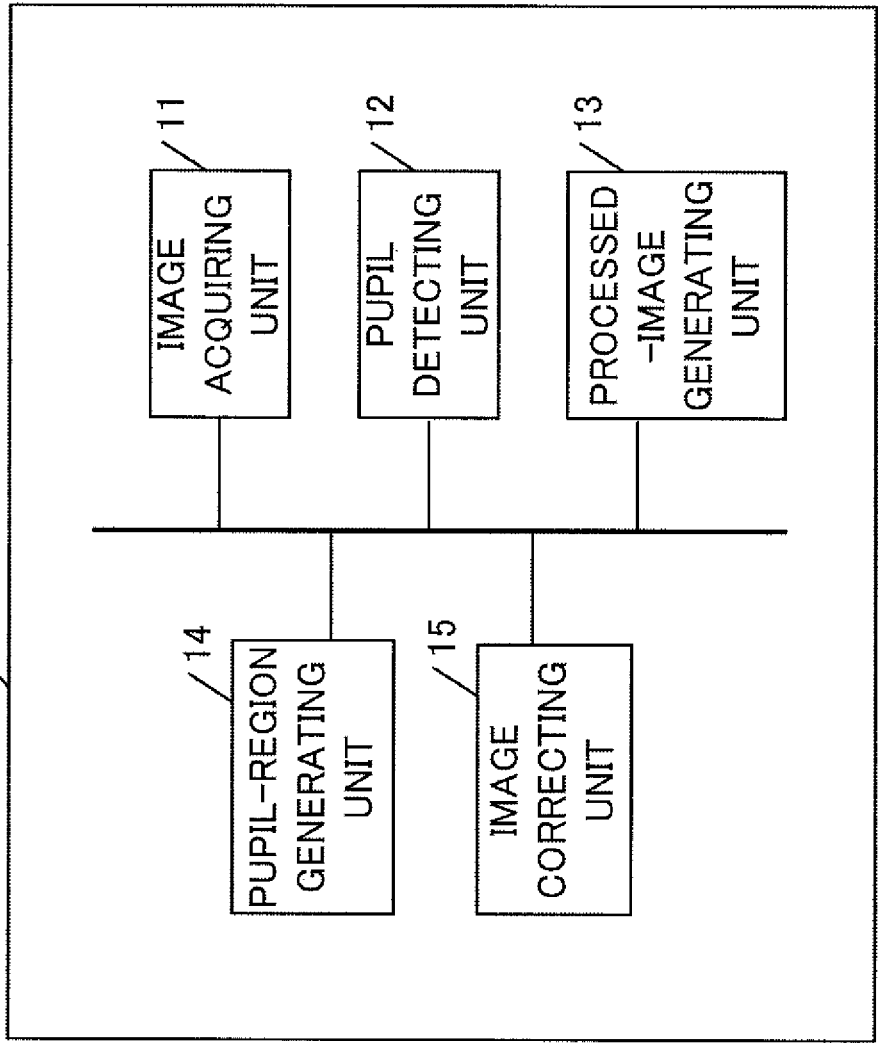
FIG. 1 is a system configuration diagram of an image processing apparatus according to an embodiment.

An image processing apparatus according to a first embodiment is an apparatus that extracts a pupil region, which is a region corresponding to a pupil of a person, from an image including a face and applies correction to the pupil region. FIG. 1 is a system configuration diagram of an image processing apparatus 10 according to this embodiment.

System Configuration

The image processing apparatus 10 according to this embodiment includes an image acquiring unit 11, a pupil detecting unit 12, a processed-image generating unit 13, a pupil-region generating unit 14, and an image correcting unit 15.

The image acquiring unit 11 is a unit that acquires a processing target image (an image including a face of a person; hereinafter, face image). Typically, the image acquiring unit 11 is a storage device such as a fixed disk drive or a flash memory. Note that the image acquiring unit 11 may be a unit (e.g., an interface device or a radio communication device) that acquires an image from the outside of the apparatus or may be a unit that picks up an image via a lens and an image pickup element. The processing target image may be an image corresponding to frames forming a moving image.

The pupil detecting unit 12 is a unit that extracts a region corresponding to an eye of the person from the face image acquired by the image acquiring unit 11. Specifically, the pupil detecting unit 12 detects feature points corresponding to the eye of the person from the face image and, after specifying a region where the eye is present, clips an image including a left or right eye. The feature points to be detected are desirably points representing the boundary of an eyelid or a center point of the eye.

The processed-image generating unit 13 is a unit that detects an edge with respect to the image clipped by the pupil detecting unit 12 and binarizes an obtained image. In the following explanation, an image after the clipping by the pupil detecting unit 12 is referred to as first image and an image generated by the processed-image generating unit 13 is referred to as second image.

The pupil-region generating unit 14 is a unit that generates a pupil region, which is a region corresponding to a pupil of a person, on the basis of the first image and the second image. A specific processing method is explained below.

The image correcting unit 15 is a unit that performs correction for the face image using the pupil region generated by the pupil-region generating unit 14. The correction performed by the image correcting unit 15 may be any correction as long as correction is applied to the pupil. For example, the correction is correction for combining a color contact lens with the pupil, correction for inputting catchlight in the pupil, correction for removing or reducing strong catchlight, correction for enhancing the contrast of the pupil, and the like but is not limited to these kinds of correction.

Note that the units explained above may be realized by exclusively designed hardware or may be realized by software modules. The units may be realized by a field programmable gate array (FPGA), an application specific integrated circuit (ASIC), or the like or may be realized by a combination of these.

When the units are configured as software, a computer program stored in an auxiliary storage device is loaded to a main storage device and executed by a CPU, whereby the units function. (None of the CPU, the auxiliary storage device, and the main storage device is shown in the figure.)

A unit that executes the computer program is not limited to the CPU and may be an image signal processor (ISP), a digital signal processor (DSP), a graphics processing unit (GPU), or the like.

Figure 2:
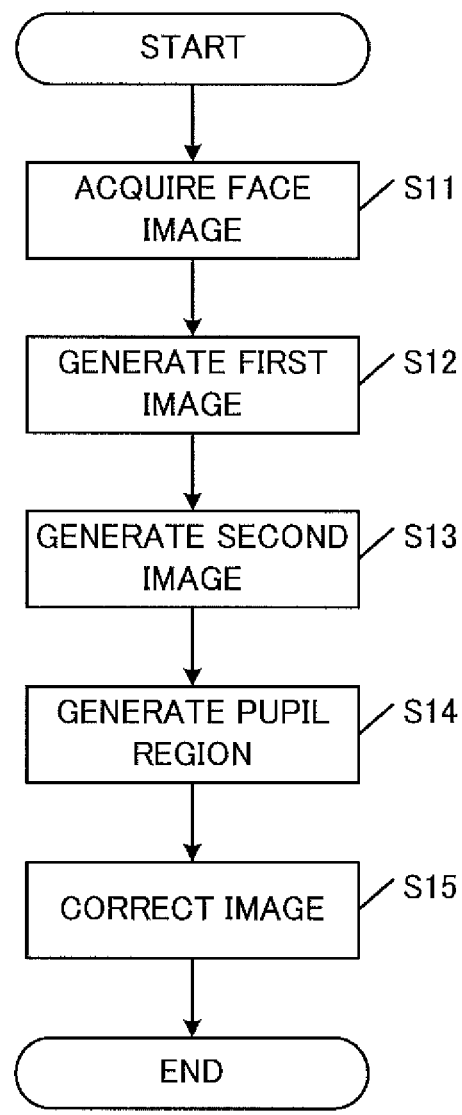
FIG. 2 is a flowchart of processing performed by the image processing apparatus.

Processing for extracting a pupil region from an acquired face image and applying correction to the pupil region is explained in order with reference to FIG. 2, which is a flowchart of processing performed by the image processing apparatus 10.

First, the image acquiring unit 11 acquires a face image (step S11). In this embodiment, a face image stored in advance is acquired from a storage device. However, a face image may be acquired via a communication unit or an image pickup unit.

Figure 3:
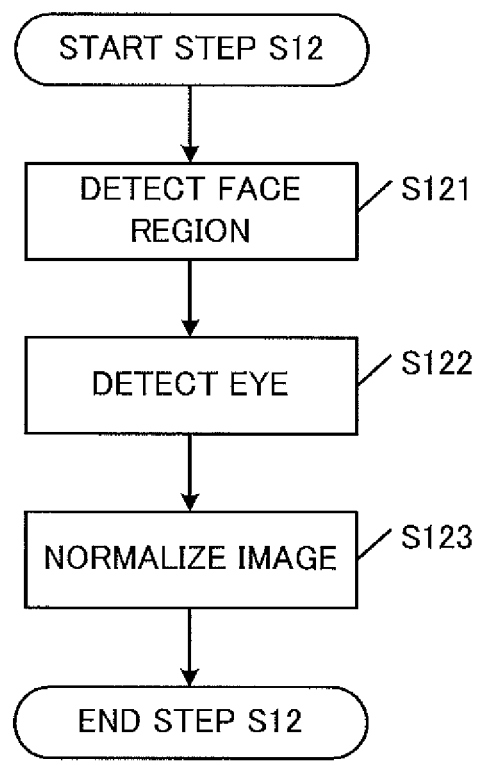
FIG. 3 is a flowchart for explaining, in detail, processing for generating a first image.

Subsequently, the pupil detecting unit 12 extracts a region corresponding to an eye from the acquired face image and clips the region to generate a first image (step S12). FIG. 3 is a flowchart for explaining, in detail, content of the processing performed in step S12.

First, in step S121, the pupil detecting unit 12 extracts a rectangular region (a face region) corresponding to a face included in the image. Since a method of extracting a face region from an image is publicly known, detailed explanation of the method is omitted.

Subsequently, in step S122, the pupil detecting unit detects the eye included in the face region. Specifically, the pupil detecting unit 12 detects, with a known method, feature points corresponding to the outer corner of the eye, the inner corner of the eye, the center of the eye, and the like. Note that, when failing in the detection of the feature points, after performing filtering, the pupil detecting unit 12 may detect the eye through matching processing.

Subsequently, in step S123, the pupil detecting unit performs normalization of the image. Specifically, the pupil detecting unit 12 clips the face region and generates a rectangular image having a predetermined size and centered on the center point of the eye. In generating the rectangular image, the pupil detecting unit 12 may perform conversion of resolution using any interpolation method. When the face included in the face image is not horizontal, the pupil detecting unit 12 may perform the clipping after performing processing for rotating the face image with affine transformation or the like. Whether the face is horizontal can be determined according to a tilt of a straight line connecting the center points of the left and right eyes.

Figure 4B:
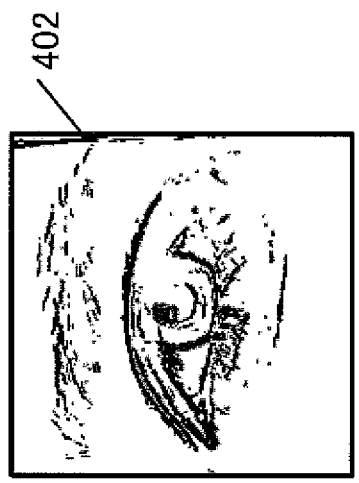
FIGS. 4A and 4B are examples of the first image and a second image.
Figure 4A:
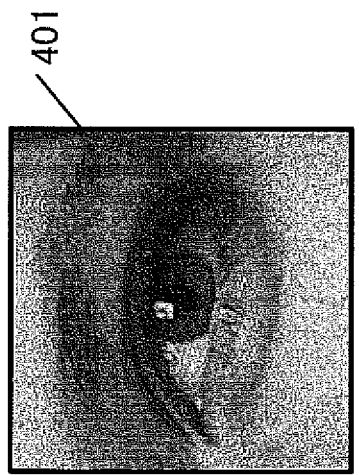

An image generated in this step is the first image. Note that the first image is an image not including color information. For example, when a color space of the face image is YUV, a component concerning a color phase is deleted and only a luminance component is used. An image 401 shown in FIG. 4A is an example of the first image. Note that, in this example, only the right eye of the person is set as a processing target. However, when both the eyes are set as the processing target, the processing explained in this specification only has to be repeated in step S123 and subsequent steps.

Subsequently, the processed-image generating unit 13 generates a second image on the basis of the first image (step S13).

In step S13, first, the processed-image generating unit 13 applies a filter for extracting an edge to the first image. As the filter, for example, a Sobel filter or the like applied in longitudinal and lateral two directions can be suitably used.

Subsequently, the processed-image generating unit 13 binarizes an obtained image. As a result, a binary image (the second image) representing an edge of the first image can be obtained. Note that a threshold in performing the binarization is desirably a value for classifying 20% to 40% of all pixels are classified to a high luminance side. An image 402 shown in FIG. 4B is an example of the second image.

Figure 5:
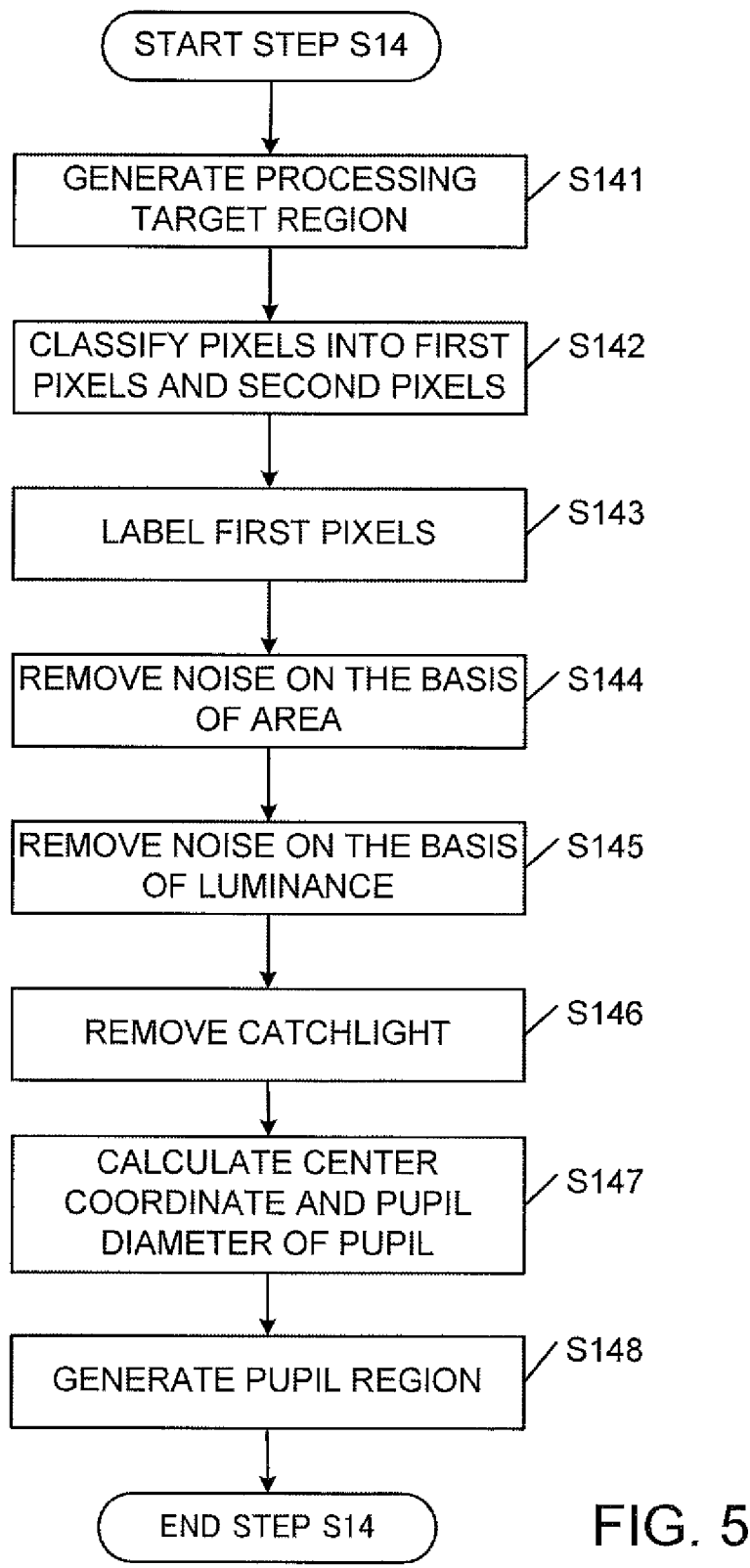
FIG. 5 is a flowchart for explaining, in detail, processing for generating a pupil region.

Subsequently, the pupil-region generating unit 14 generates a pupil region on the basis of the first image and the second image (step S14). FIG. 5 is a flowchart for explaining, in detail, content of the processing performed in step S14.

Figure 6A:
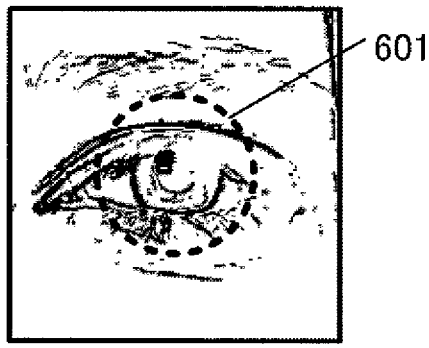
FIGS. 6A to 6D are diagrams for explaining a process for performing noise removal processing.
Figure 6B:

First, in step S141, the pupil-region generating unit generates a processing target region. In this embodiment, a circle region having a predetermined diameter and centered on the center point of the eye is the processing target region (reference numeral 601 shown in FIG. 6A). Note that the predetermined diameter is desirably approximately 15% to 30% of the distance between the centers of the left and right eyes.

Steps S142 to S146 are steps for removing noise of the second image.

First, in step S142, the pupil-region generating unit 14 classifies, among pixels of the second image, pixels not representing an edge into a first pixel type and pixels representing the edge into a second pixel type. The pupil-region generating unit 14 unconditionally classifies pixels present on the outer side of the processing target region into the second pixel type.

In an image 602 shown in FIG. 63, the pixels classified into the first pixel type (i.e., the pixels not corresponding to the edge) are represented by white and the pixels classified into the second pixel type (i.e., the pixels corresponding to the edge) are represented by black.

The image processing apparatus according to this embodiment estimates, on the basis of a classification result of the pixels (i.e., presence or absence of the edge), a region where the pupil is present. However, when the classification is performed only according to the presence or absence of the edge, in some case, a place unrelated to the pupil is included. Therefore, in this embodiment, the processing in steps S143 to S145 is performed to remove noise.

First, the pupil-region generating unit 14 applies labeling by 4-neighbor to the pixels classified into the first pixel type (step S143). That is, when a certain pixel is classified into the first pixel type and all of four pixels above, below, on the left, and on the right of the pixel are classified into the first pixel type, the same label is given to the corresponding pixels. Consequently, different labels are given to respective groups of the pixels classified into the first pixel type present separately in a plurality of blocks.

Note that a method of the labeling is not limited to the 4-neighbor and may be other methods such as 8-neighbor.

Subsequently, the pupil-region generating unit 14 performs noise removal using an area as a determination criterion (step S144).

First, the pupil-region generating unit 14 calculates areas of the labeled blocks for the respective labels and calculates a largest area. The pupil-region generating unit 14 reclassifies the pixels included in the blocks, the areas of which are n % or less of the largest area, into the second pixel type. Consequently, it is possible to remove fine noise. Note that a value of n is desirably 5 to 30.

Subsequently, the pupil-region generating unit 14 performs noise removal using luminance as a determination criterion (step S145).

First, the pupil-region generating unit 14 acquires, concerning the labeled blocks, average luminance values of the pixels in a corresponding region of the first image and calculates a lowest value (a lowest average luminance value) out of the average luminance values.

The pupil-region generating unit 14 reclassifies the pixels included in the blocks, the average luminance values of which are higher than a value obtained by adding m to the lowest average luminance value, into the second pixel type. Note that, when a luminance value is 256 gradations, m is desirably 20 to 60.

For example, when the luminance value is represented by 256 gradations, the lowest average luminance value is 20, and a value of m is 30, the pupil-region generating unit 14 reclassifies the pixels included in the blocks, the average luminance values of which is larger than 50, into the second pixel type.

Consequently, it is possible to remove regions other than the pupil where the edge is absent (e.g., a region corresponding to the white of the eye and a region corresponding to skin).

Figure 6C:

An image obtained after the processing explained above is applied to the image 602 is an image 603 shown in FIG. 6C.

By executing the steps explained above, it is possible to remove regions corresponding to the white of the eye and the skin and regions due to noise.

On the other hand, as it is seen from the image 603, when catchlight is present on the inside of the pupil, since the edge is detected, the pixels in a portion corresponding to the catchlight are classified into the second pixel type. Therefore, in step S146, the pupil-region generating unit 14 detects the blocks of the pixels classified into the second pixel type, which are present by being surrounded by the pixels classified into the first pixel type, and, when such blocks are present, reclassifies the pixels included in the blocks into the first pixel type. Consequently, it is possible to classify the pixels into the first pixel type without being affected by information concerning the edge present in the pupil.

Note that, in this example, the reclassification is performed only when the pixels classified into the second pixel type are completely surrounded by the pixels classified into the first pixel type. However, when the pupil region is formed in an unnatural shape, for example, when the pixels classified into the second pixel type are formed in an extreme convex shape, only the pixels corresponding to the projecting portion may be reclassified into the first pixel type.

Figure 6D:
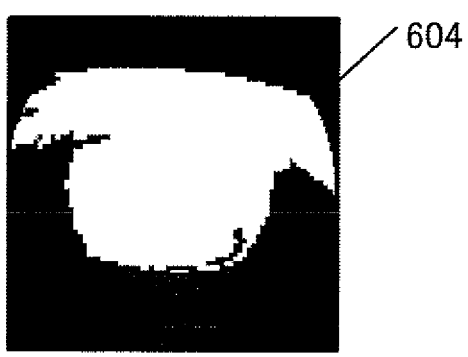

An image after the processing in step S146 is applied to the image 603 is an image 604 shown in FIG. 6D. In the following explanation, a region formed by the pixels classified into the first pixel type (a white region shown in the image 604) is referred to as provisional pupil region.

Note that, in the image 604, fine irregularities are present in the boundary of the provisional pupil region. However, the irregularities may be removed by performing smoothing processing or the like.

As it is seen from the image 604, the provisional pupil region includes a circular region corresponding to the pupil and a region having a crescent shape corresponding to the pupil. The region corresponding to the pupil cannot be removed because a luminance value is low and an edge is absent in the region.

Therefore, the image processing apparatus according to this embodiment extracts, with a method explained below, only the circular region corresponding to the pupil from the provisional pupil region.

In step S147, the pupil-region generating unit 14 executes three steps explained below to generate a pupil region.

(1) Determine an X Coordinate of the Center Point of the Pupil

This step is a step of determining an X coordinate of the center of the pupil region.

Figure 7A:
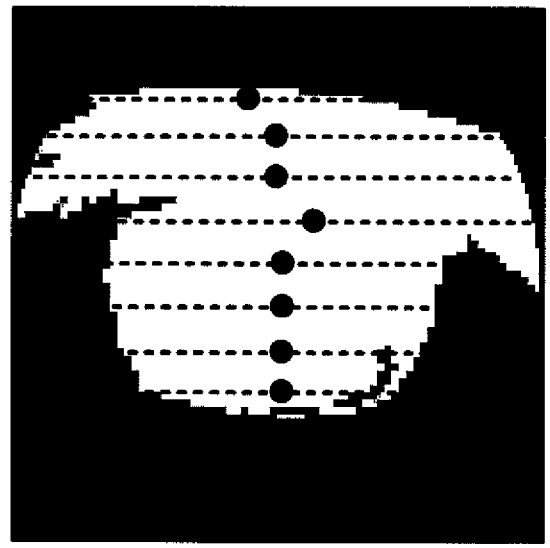
FIGS. 7A and 7B are diagrams for explaining a process for specifying the pupil region.

Specifically, first, the pupil-region generating unit calculates an X coordinate, which is a center point on the X axis of the provisional pupil region, for respective Y coordinates. FIG. 7A is a diagram showing an overview for calculating the X coordinate, which is the center point, for the respective Y coordinates. Circles in the figure represent the calculated X coordinates. Note that, although FIG. 7A shows only eight Y coordinates, an actual number of times of calculation is different depending on the resolution of an image.

Figure 7B:
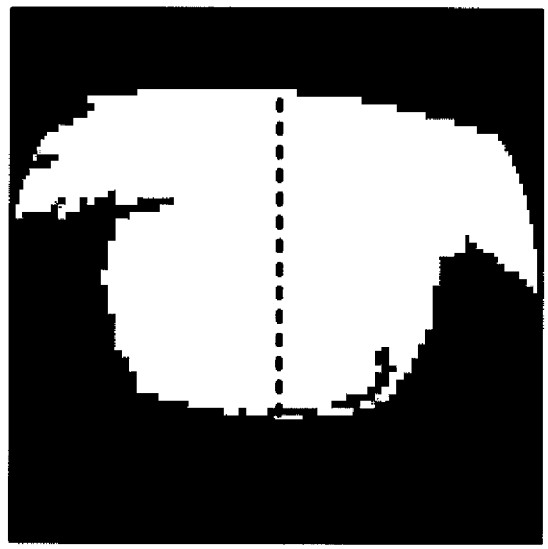

Subsequently, the pupil-region generating unit 14 determines an X coordinate in the center of the pupil region on the basis of a distribution of the obtained X coordinates. For example, a value of the X coordinate most often obtained may be set as the center of the pupil region. Besides, any value such as an average or a median may be adopted if the value can be calculated on the basis of a distribution of a plurality of X coordinates. FIG. 7B represents the X coordinates of the center of the pupil determined in this step.

(2) Determine a Y Coordinate of the Center Point of the Pupil

This step is a step of determining a Y coordinate of the center of the pupil region.

Figure 8:
FIG. 8 is a diagram for explaining the process for specifying the pupil region.

Specifically, an intermediate value between a maximum and a minimum of Y coordinates of the provisional pupil region is set as a Y coordinate of the center of the pupil region. In FIG. 8, white dotted lines represent the maximum and the minimum of the Y coordinate of the provisional pixel region and a black dotted line represents the intermediate value.

According to the processing explained above, a center coordinate of the pupil region is calculated.

(3) Determine a Diameter of the Pupil (a Pupil Diameter)

This step is a step of determining a diameter of the pupil (a pupil diameter).

Specifically, the diameter of the provisional pupil region on an axis passing through the center of the pupil region and parallel to the X axis is set as the diameter of the pupil region. That is, the length of the black dotted line in FIG. 8 is the diameter of the pupil region.

By using such a method, even when the eyelid is included in the provisional pupil region, it is possible to appropriately determine the diameter of the pupil as long as the eyelid is present above the center of the pupil.

Note that a shift sometimes occurs in the X coordinate of the center point of the pupil because of the shape of the eyelid and the eyelashes. For example, a middle point of the diameter of the pupil region calculated in this step shifts from the coordinate of the center point of the pupil calculated in the preceding step. In such a case, the center point of the pupil may be calculated again by another method. The calculated coordinate of the center point may be corrected by another method.

Figure 9A:
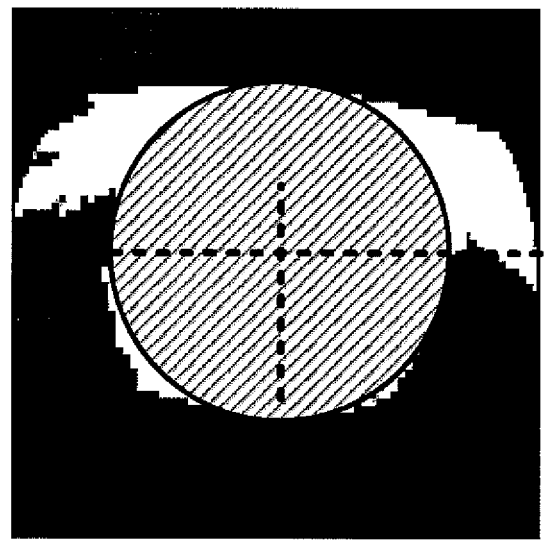
FIGS. 9A and 9B are diagrams for explaining the process for specifying the pupil region.
Figure 9B:
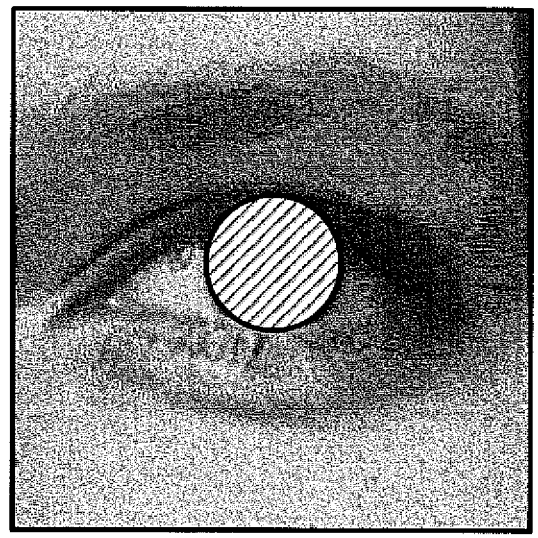

In step S148, the pupil region is generated using the center coordinate of the pupil region and the diameter of the pupil region determined in step S147. A region indicated by hatching in FIG. 9A is the pupil region represented by using the center coordinate of the pupil region and the diameter of the pupil region. FIG. 9B is an example in which the pupil region is superimposed on the first image.

Note that, in this example, a part of the pupil is hidden by the eyelid. Therefore, in such a case, it is desirable to correct the shape of the pupil region using the shape of the eyelid. For example, the shape of the eyelid can be estimated by spline interpolation or the like using the position information of the feature points acquired by the pupil detecting unit 12. Such a technique is disclosed in Japanese Patent Application Laid-Open No. 2012-190350 and Japanese Patent Application Laid-Open No. 2012-190351. Besides, when the shape of the eyelid is already acquired by another means, the shape of the eyelid may be used.

Figure 10:
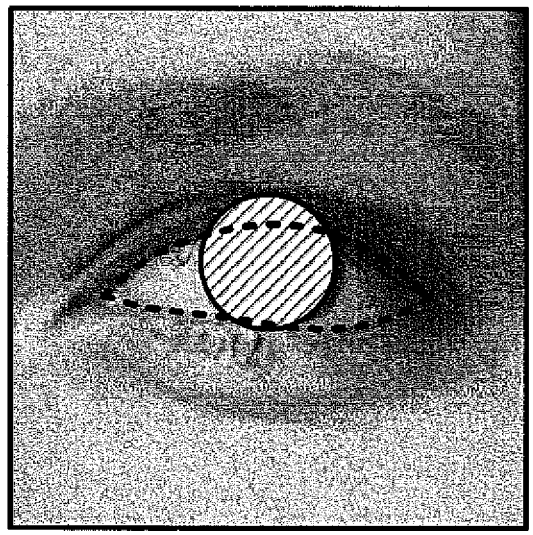
FIG. 10 is a diagram showing an example in which the pupil region is corrected according to the position of an eyelid.

The dotted line in FIG. 10 represents the shape of the eyelids For example, regions projecting further outward than the eyelid may be deleted from the pupil region.

Information concerning the generated pupil region is transmitted to the image correcting unit 15. The image correcting unit 15 executes correction for the face image using the acquired pupil region (step S15). Examples of the correction performed by the image correcting unit 15 include correction for changing the color of the pupil (correction for combining a color contact lenses). For example, the change of the color of the pupil may be performed by pasting a template image of the pupil to the generated pupil region or may be performed by changing a hue of the pixels in the pupil region. Naturally, the image correcting unit 15 may perform any other correction as long as the pupil is corrected. For example, the correction may be correction for adding catchlight to the inside of the pupil, correction for enhancing the contrast of the pupil, and correction for making the pupil look beautiful.

The corrected image is stored in a not-shown storage device or transmitted to the outside and provided to the user.

As explained above, the image processing apparatus according to this embodiment generates the binary image representing the edge from the image including the eye of the person and removes noise to specify the pupil region. Consequently, it is possible to more accurately extract only the pupil region while removing catchlight present in the eyelid, the white of the eye, and the inside of the pupil, skin present around the eye, and the like.

Second Embodiment

In the first embodiment, in the processing in step S14, both of the noise removal based on the area (step S144) and the noise removal based on the luminance (step S145) are executed. On the other hand, a second embodiment is an embodiment in which the processing in step S144 is omitted and only the noise removal based on the luminance is performed.

The image processing apparatus 10 according to the second embodiment is the same as the image processing apparatus 10 in the first embodiment except that the pupil-region generating unit 14 does not perform the processing in step S144.

In this way, when the noise removal processing based on the area is omitted and only the noise removal processing based on the luminance is performed, it is also possible to obtain the effects of the present invention.

Modifications

The embodiments explained above are only examples. The present invention can be changed and carried out as appropriate without departing from the spirit of the present invention.

For example, in the explanation of the embodiments, the apparatus that performs the correction of the face image is illustrated. However, the image correcting unit is not essential as a constituent element of the invention. For example, as opposed to the apparatus and the computer program for performing correction of the image, the invention may be carried out as an apparatus and a computer program for notifying the position of the pupil region.

In the explanation of the embodiments, the image processing apparatus that applies the processing to the image stored in the storage device is explained as an example. However, the image does not always need to be acquired from the storage device and, for example, may be acquired from the outside of the apparatus via a wired or wireless network.

The present invention may be carried out as an image pickup apparatus having a function of correcting a pupil of a person by combining an image pickup unit that picks up an image and the image processing apparatus.

What is claimed is:

1. An image processing apparatus comprising:
    an image acquiring unit configured to acquire a first image, which is an image including an eye of a person;
    an image generating unit configured to generate a second image, which is a binary image representing an edge of the first image;
    a classifying unit configured to classify, on the basis of presence or absence of the edge, pixels included in the second image; and
    a pupil-region generating unit configured to generate a pupil region, which is a region corresponding to a pupil of the person in the first image, on the basis of a result of the classification,
    wherein the classifying unit comprises:
        a first classifying unit configured to classify, among the pixels included in the second image, the pixels not corresponding to the edge into a first pixel type and the pixels corresponding to the edge into a second pixel type; and
        a second classifying unit configured to reclassify, when the pixels not corresponding to the edge are present separately in a plurality of blocks and when there is a block having an area which is smaller than a first threshold, the pixels included in the block into the second pixel type,
    wherein the pupil-region generating unit generates the pupil region on the basis of a distribution of the pixels classified into the first pixel type.

2. The image processing apparatus according to claim 1, further comprising a third classifying unit configured to reclassify, when a block of the pixels classified into the second pixel type is surrounded by the pixels classified into the first pixel type, the pixels included in the block into the first pixel type.

3. The image processing apparatus according to claim 1, wherein the first threshold is a value obtained by multiplying a largest area among respective areas of the plurality of blocks by a predetermined ratio.

4. The image processing apparatus according to claim 1, wherein the second threshold is a value obtained by adding a predetermined value to a lowest value among average luminance values respectively corresponding to the plurality of blocks.

5. The image processing apparatus according to claim 1, wherein, when a lateral direction of the first image is taken as an X axis and a longitudinal direction of the first image is taken as a Y axis and a region formed by the pixels classified into the first pixel type is set as a provisional pupil region, the pupil-region generating unit sets, as a Y coordinate of a center of the pupil region, an intermediate value between a maximum value and a minimum value of a Y coordinate of the provisional pupil region, calculates X coordinates, each of which is a center point on the X axis of the provisional pupil region, for respective Y coordinates, and determines an X coordinate of the center of the pupil region on the basis of a distribution of the obtained X coordinates.

6. The image processing apparatus according to claim 5, wherein the pupil-region generating unit sets, as a diameter of the pupil region, a diameter of the provisional pupil region on an axis passing through the center of the pupil region and parallel to the X axis.

7. The image processing apparatus according to claim 1, further comprising a position-information acquiring unit configured to acquire position information representing a boundary position of an eyelid, wherein
    the pupil-region generating unit corrects a shape of the generated pupil region on the basis of the position information.

8. The image processing apparatus according to claim 1, wherein the first classifying unit sets a circle region having a predetermined size and centered on a center point of the eye, and unconditionally classifies the pixels present outside the circle region into the second pixel type.

9. An image processing method performed by an image processing apparatus that extracts a pupil region, which is a region corresponding to a pupil of a person, from a first image, which is an image including an eye of the person, the image processing method comprising:
    an image acquiring step of acquiring the first image;
    an image generating step of generating a second image, which is a binary image representing an edge of the first image;
    a classifying step of classifying, on the basis of presence or absence of the edge, pixels included in the second image; and
    a pupil-region generating step of generating the pupil region, which is the region corresponding to the pupil of the person in the first image, on the basis of a result of the classification,
    wherein the classifying step comprises:
        a first classifying step of classifying, among the pixels included in the second image, the pixels not corresponding to the edge into a first pixel type and the pixels corresponding to the edge into a second pixel type; and
        a second classifying step of reclassifying, when the pixels not corresponding to the edge are present separately in a plurality of blocks and when there is a block having an area which is smaller than the first threshold, the pixels included in the block into the second pixel type,
    wherein the pupil-region generating step further comprises generating the pupil region on the basis of a distribution of the pixels classified into the first pixel type.

10. A non-transitory computer readable storing medium recording a computer program for causing a computer to execute each of the steps of the image processing method according to claim 9.

* * * * *